(12) United States Patent
Atreya et al.

(10) Patent No.: US 9,906,896 B2
(45) Date of Patent: Feb. 27, 2018

(54) CLIENT LOCATION DISCOVERY

(71) Applicant: Avaya Inc., Basking Ridge, NJ (US)

(72) Inventors: Vivek L. Atreya, Bangalore (IN);
Shashi H. Ankaiah, Bangalore (IN);
Seung Bong Han, Fremont, CA (US);
Seemant Choudhary, Fremont, CA (US)

(73) Assignee: Avaya Inc., Basking Ridge, NJ (US)

( * ) Notice: Subject to any disclaimer, the term of this patent is extended or adjusted under 35 U.S.C. 154(b) by 86 days.

(21) Appl. No.: 14/033,447

(22) Filed: Sep. 21, 2013

(65) Prior Publication Data

US 2015/0089044 A1   Mar. 26, 2015

(51) Int. Cl.
*G06F 15/16* (2006.01)
*H04W 4/02* (2018.01)
*H04W 64/00* (2009.01)

(52) U.S. Cl.
CPC ............. *H04W 4/02* (2013.01); *H04W 64/00* (2013.01)

(58) Field of Classification Search
CPC .................................................... H04W 64/00
USPC ......................................................... 709/224
See application file for complete search history.

(56) References Cited

U.S. PATENT DOCUMENTS

| 9,244,152 B1 * | 1/2016 | Thiagarajan | G01S 5/10 |
| 2004/0003125 A1 * | 1/2004 | Ichimura | 709/249 |
| 2005/0148342 A1 * | 7/2005 | Sylvain | 455/456.3 |
| 2006/0259599 A1 * | 11/2006 | Verberkt et al. | 709/223 |
| 2009/0061898 A1 * | 3/2009 | Johnson et al. | 455/456.2 |
| 2009/0280827 A1 * | 11/2009 | Michaud | G01S 5/0252 455/456.1 |
| 2010/0291947 A1 * | 11/2010 | Annamalai | 455/456.1 |
| 2011/0177831 A1 * | 7/2011 | Huang | 455/457 |
| 2011/0301912 A1 * | 12/2011 | Pandey et al. | 702/150 |
| 2012/0280863 A1 * | 11/2012 | Persson et al. | 342/386 |
| 2013/0028245 A1 * | 1/2013 | Oerton et al. | 370/338 |
| 2013/0170374 A1 * | 7/2013 | Aljadeff | G01S 5/14 370/252 |
| 2013/0178253 A1 * | 7/2013 | Karaoguz | H04W 52/283 455/574 |
| 2013/0182697 A1 * | 7/2013 | Tuominen | G01S 5/0242 370/338 |
| 2013/0217427 A1 * | 8/2013 | Bajko | 455/507 |
| 2013/0237204 A1 * | 9/2013 | Buck | H04M 1/72569 455/418 |
| 2013/0308618 A1 * | 11/2013 | Panneerselvam | 370/338 |
| 2013/0339478 A1 * | 12/2013 | Edge et al. | 709/217 |
| 2014/0171068 A1 * | 6/2014 | Marti et al. | 455/427 |
| 2014/0179352 A1 * | 6/2014 | V.M. et al. | 455/456.2 |

(Continued)

*Primary Examiner* — Hamza Algibhah
(74) *Attorney, Agent, or Firm* — IP Spring

(57) ABSTRACT

One or more implementations can include methods, systems and computer readable media for client location discovery. In some implementations, the method can include receiving, at an access point, a location discovery request message from a client and sending a request from the access point to a location server requesting location information for the client, when a location server is available. The method can also include receiving location information from the location server, when a location server is available and providing the access point location as location information, when a location server is not available. The method can further include sending the location information as a response to the client.

20 Claims, 4 Drawing Sheets

(56) References Cited

U.S. PATENT DOCUMENTS

2014/0200025 A1* 7/2014 Wouhavbi et al. ........ 455/456.1
2015/0085669 A1* 3/2015 Prechner et al. ............ 370/241

* cited by examiner

US 9,906,896 B2

CLIENT LOCATION DISCOVERY

TECHNICAL FIELD

Embodiments relate generally to computer networks, and more particularly, to methods, systems and computer readable media for client location discovery.

BACKGROUND

In some networks, access points (APs) may be wireless control plane (WCP) managed devices and may not provide standard interfaces (e.g., console, telnet/SSH, HTTP or the like) for device configuration. Access points may discover a WCP using a discovery protocol and establishing a control channel with the WCP device.

Configuration for the access points may be defined on the WCP and pushed to the access point when it associates with the WCP over the control channel. For example, access point profiles can be used to define the AP configuration on a WCP.

A WCP managed device applies the received configuration from WCP with which it has associated. Access points report monitoring information to the WCP with which it has associated.

There are some conventional techniques for determining a location of a client, such as the triangulation method. The triangulation method relies on measuring the signal strengths of clients at multiple access points. A centralized program can receive these measurements from the APs and convert the measured values into estimated distances and the triangulation method can be applied to determine a location of the client.

Further, location tracking applications may be offered by both WLAN vendors (e.g., as an integrated component of a wireless controller) and third-party application vendors. Traditionally, location-aware applications have tended to be server-side applications, which may be used to serve relevant content to clients.

Recently, there has been an increase in the number of client applications, which may benefit from being location-aware. Global positioning system (GPS) receivers typically do not work well indoors. Thus, network providers may have a need to compute and provide location information to clients.

A problem for client applications can be the discovery of a location server within a provider/enterprise network. Static location server configuration would likely not be feasible for many network environments. Thus, there may be a need for a platform independent mechanism for clients (e.g., client applications) to obtain location data in indoor environments.

Embodiments were conceived in light of the above mentioned needs, problems and/or limitations, among other things.

SUMMARY

One or more embodiments can include methods, systems and computer readable media for client location discovery. In some implementations, the method can include receiving, at an access point, a location discovery request message from a client and sending a request from the access point to a location server requesting location information for the client, when a location server is available. The method can also include receiving location information from the location server, when a location server is available and providing the access point location as location information, when a location server is not available. The method can further include sending the location information as a response to the client.

Some implementations can include a system comprising one or more processors configured to perform operations corresponding to the method steps set forth above.

Some implementations can include a nontransitory computer readable medium having stored thereon software instructions that, when executed by a processor of a wireless controller, cause the processor to perform operations corresponding to the method steps set forth above.

In any of the above implementations: The location discovery request message can include a multicast request sent over a reserved link-local multicast address and the access point snoops the multicast request. The location discovery request message can specify a type of location data being requested.

The location discovery request message can specify a frequency for updating the location information to the client. The response can be sent as a unicast message from the access point to the client.

The client can include a client device. The client can include one or more client applications.

DETAILED DESCRIPTION

Figure 1:
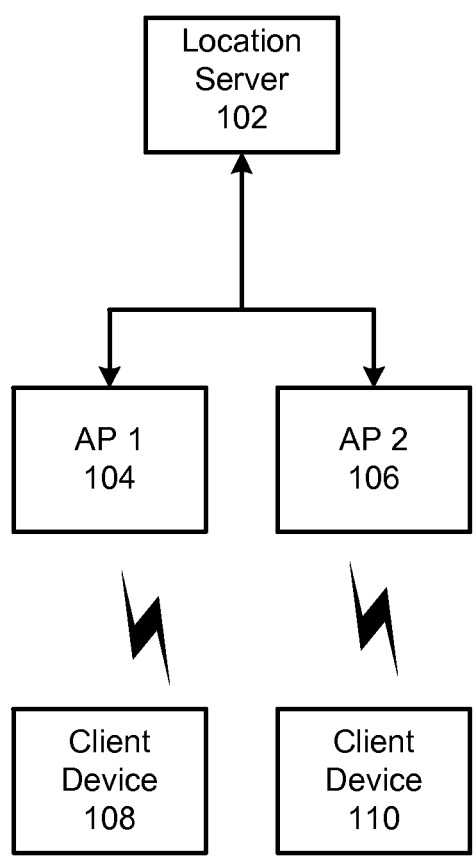
FIG. 1 is a diagram of an example network in accordance with at least one implementation.

The IEEE 802.11v standard includes options for a client to query an access point for its location information. However, supporting 802.11v may require upgrades to the WLAN firmware on all clients. Also, many devices may not support 802.11v. Further, client applications running on mobile devices may not have access to driver routines to fetch the location information via 802.11v, thus making it unusable in some situations.

Depending on the location server deployed, clients or client applications may need to be configured and setup. For example, the location server's address/port numbers may need to be configured on the client. This configuration and setup is likely not feasible in many instances.

Also, clients and/or client applications may need to continue polling the location tracking application frequently to keep location data current. This polling may lead to unnecessary traffic over the network and may drain mobile device batteries.

Some proposed location server interface protocols have suggested expiry times for caching location information at clients. This approach can lead to clients polling even when the location has not changed and/or may prevent them from polling when the location is changing rapidly. Also, as the number of client devices increases, the infrastructure for location tracking may need to be scaled up as well, which can lead to cost escalation for such deployments.

In general, some implementations include a link-local multicast-based mechanism for client devices (or applications) to discover their location without any prior configuration. The client (or an application on the client) can send out a "request location" message to a reserved link-local multicast address. The request can carry parameters such as type of location data being requested (e.g., geo, coarse, civic or the like) and frequency of updates.

The AP to which the client is associated can snoop the multicast request. The AP can be aware of the availability and the address of the location server. The AP can be made aware of this information through a configuration download from the wireless controller.

If the AP is aware of the location server, the AP can fetch the client location information from the location tracking application and cache the same. The AP can frame the location information as a response and send the response to the client (e.g., as a unicast packet).

In the absence of a location server, the AP can reply back with location information of the AP itself. APs are typically tagged with their location coordinates and/or a coarse location string (e.g., "First Floor, East Wing").

As APs constantly measure the received signal strength from clients (e.g., RSSI), a varying value of RSSI can indicate that the client is moving. When the client RSSI varies beyond a threshold, the AP can refresh the client data by querying the location server. If the location data has changed, it updates its cache and sends the changed data to the client. An AP can execute the same procedure when the client roams to a new AP.

The frequency of location updates from an AP to the client can be governed by set policies (e.g., WLAN infrastructure policies) and/or the frequency requested by the client. While APs are mentioned as example devices for snooping and responding to clients, it will be appreciated that any other authorized device (including the location server) in the network listening and responding to requests. In such cases, the AP can permit responses from only the authorized device to reach client devices. This can prevent location data tampering by rogue devices.

Some implementations can provide a zero configuration mechanisms for client devices and/or client applications to obtain location information. Some implementations can permit client applications (e.g., Avaya Flare) to obtain location information in a platform, OS and firmware independent way.

In some implementations, access points can be configured to act as location gateways by snooping location queries, looking up client location data, adding AP location data and sending responses to clients. Some implementations can include WLAN infrastructure driven updates (e.g., push updates) to clients based on client movement detection using variation in measured signal strength (e.g., RSSI) value from clients.

The implementations described herein can scale well with increased clients. APs can cache client information for the clients associated with those APs and respond to clients with the cached information. Thus, an AP can act as a type of load balancer for the location servers. This can removing some or all scaling issues associated with location servers and may bring down an overall cost for location-aware deployments by reducing the scaling infrastructure of the location application servers.

As shown in FIG. 1, a client location discovery system includes a location server 102, a first AP 104, a second AP 106, a first client device 108 and a second client device 110.

In operation, the client devices (108, 110) or applications running on the client devices can obtain location information from the location server via an associated AP (e.g., as described below in connection with FIGS. 2 and 3). The client devices and/or applications do not require knowledge of the location server 102 (e.g., address, state, type, capabilities or the like).

Figure 2:
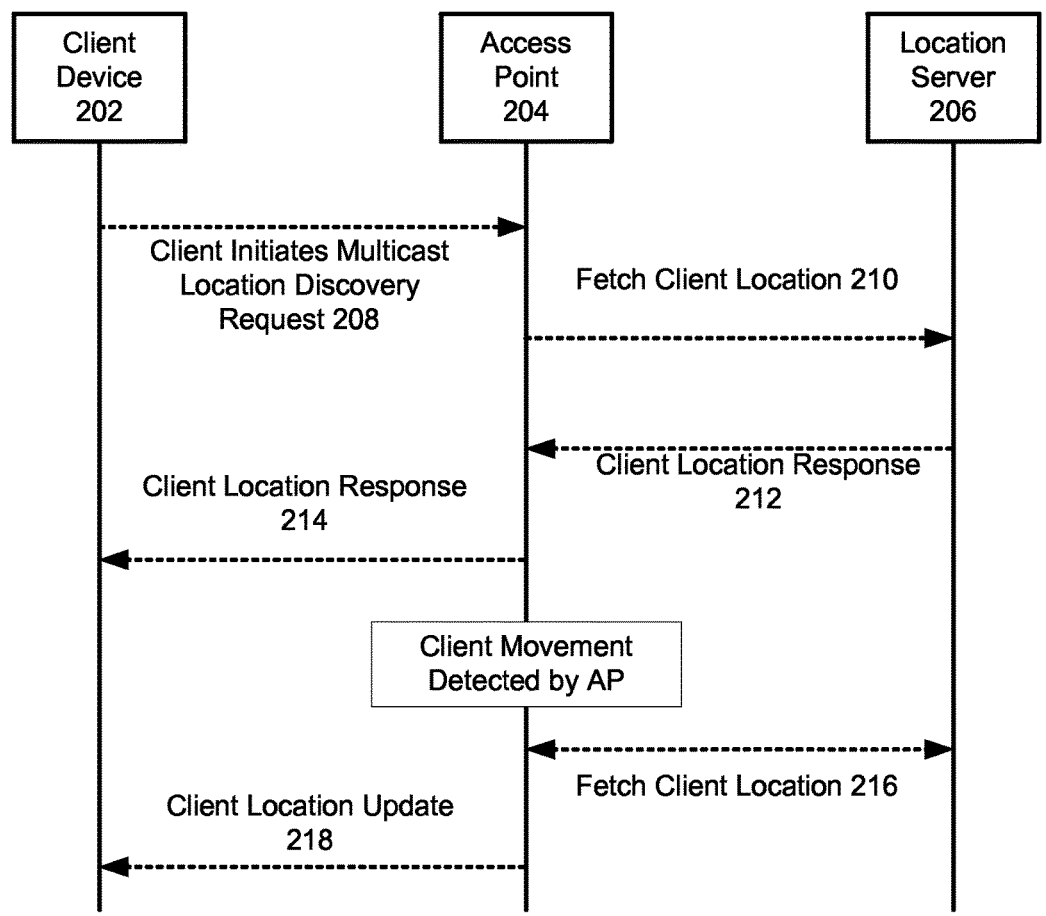
FIG. 2 is a diagram of an example client location discovery dataflow in accordance with at least one implementation.

FIG. 2 is a diagram of an example client location discovery dataflow in accordance with at least one implementation.

In operation, a client device 202 initiates or broadcasts a multicast location discovery request 208. The request is received by an access point 204.

The access point 204 fetches or requests the client location 210 from a location server 206. The location server 206 responds with the client location information 212. The access point, in turn, formats the location information as a response and sends the formatted information 214 to the client device 202.

At 216, the access point 204 detects movement of the client device (e.g., via change in signal strength and/or new access point association). The access point 204 (or new access point) can request an update of the client location and receive the update 218. The access point 204 can format the update and send the formatted update 220 to the client device 202.

Figure 3:
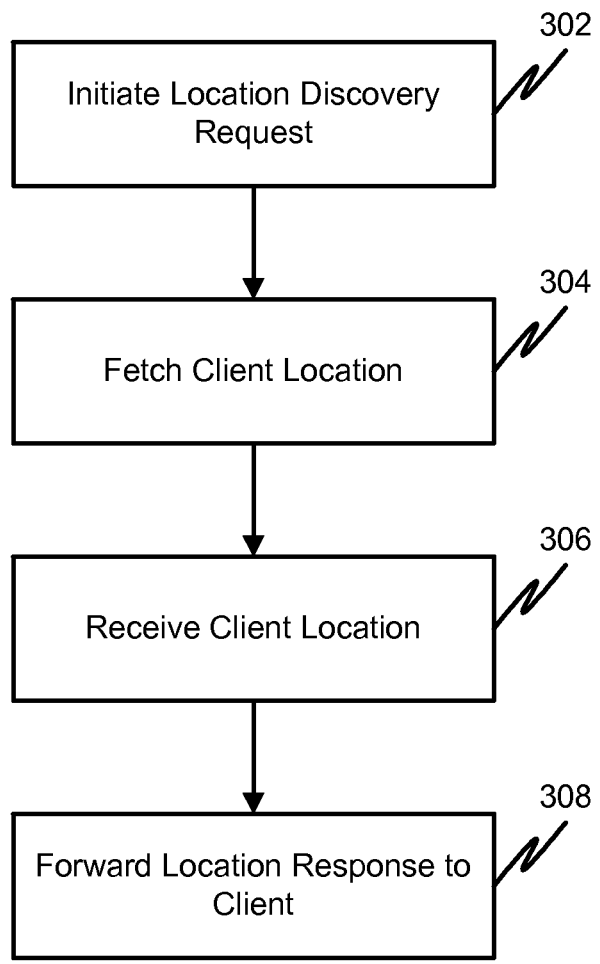
FIG. 3 is a flow chart of an example method for client location discovery in accordance with at least one implementation.

FIG. 3 is a flow chart of an example method for client location discovery in accordance with at least one implementation. Processing begins at 302, where a client device or applications initiates a location discovery request. For example, the client can send out a "request location" message on a reserved link-local multicast address. The request location message can be empty or carry one or more parameters such as type of location data being requested (e.g., geo, coarse, civic or the like) and frequency of location updates. Processing continues to 304.

At 304, an access point to which the client device is associated recognizes the request location messages and fetches the client location from a location server known to the access point, but possibly not known to the client. Processing continues to 306.

At 306, the access point receives the location information from the location server and frames the location information as a response to the client. Processing continues to 308.

At 308, the access point sends the response message to the client (e.g., as a unicast message).

It will be appreciated that 302-308 can be repealed in whole or in part in order to accomplish a contemplated location task.

Figure 4:
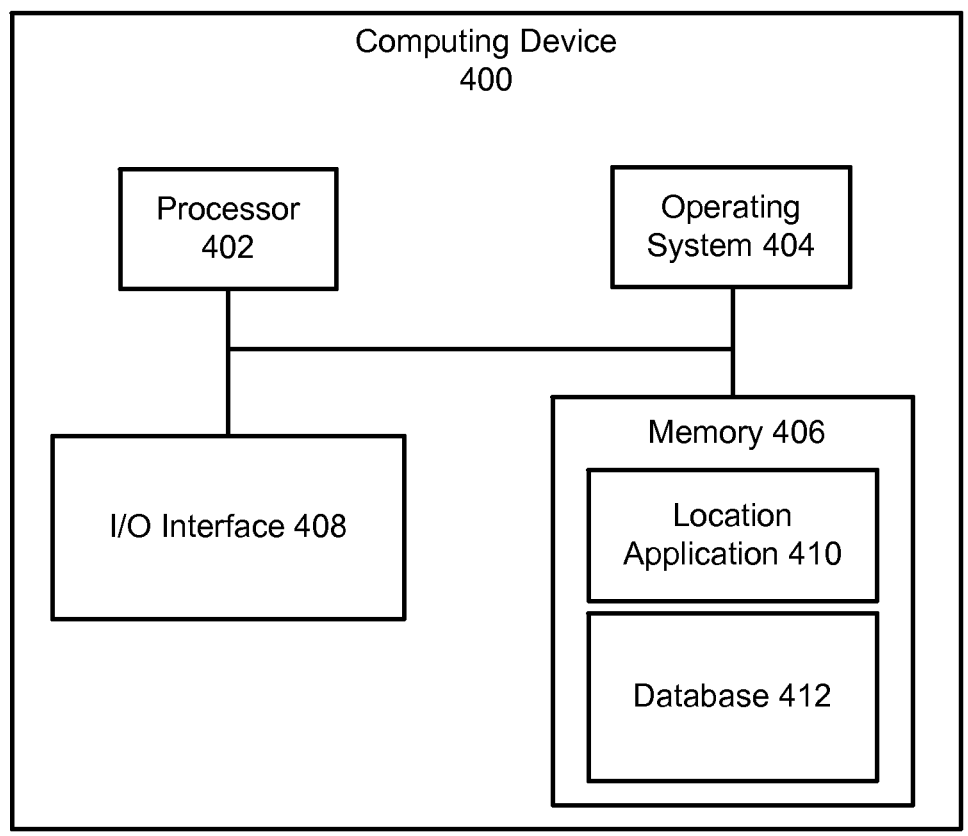
FIG. 4 is a diagram of an example computer system for client location discovery in accordance with at least one implementation.

FIG. 4 is a diagram of an example computer system 400 in accordance with at least one implementation. The computer 400 includes a processor 402, operating system 404, memory 406 and I/O interface 408. The memory 406 can include a location application 410 and a database 412 (e.g., for storing locations or the like).

In operation, the processor 402 may execute the application 410 stored in the memory 406. The application 410 can include software instructions that, when executed by the processor, cause the processor to perform operations for network management in accordance with the present disclosure (e.g., performing one or more of steps 302-308).

The application program 410 can operate in conjunction with the database 412 and the operating system 404.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, the C#.NET framework, assembly or the like. The instructions can also comprise code and data objects provided in accordance with, for example, the Visual Basic™ language, or another structured, object-oriented, imperative or declarative programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for client location discovery.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A method comprising:
receiving, at an access point, a location discovery request message from a client;
measuring received signal strength from the client;
determining that the client is moving based on a varying value of the received signal strength;
refreshing client location information if the value of the received signal strength varies beyond a threshold, wherein refreshing of the client location information comprises sending a request from the access point to a location server, wherein the request requests client location information for the client, and wherein the location discovery request message specifies a frequency for updating the location information to the client;
receiving client location information from the location server if the location server is available;
caching the client location information at the access point, wherein the access point functions as the location server and responds to location discover requests based on cached client location information;
determining access point location information of the access point if the location server is not available; and
sending either the client's location information or the access point location information in a response to the client if the location information indicates that a location of the client has changed.

2. The method of claim 1, wherein the location discovery request message is a multicast request sent over a reserved link-local multicast address and the access point snoops the multicast request.

3. The method of claim 1, wherein the location discovery request message specifies a type of location data being requested.

4. The method of claim 1, wherein the location discovery request message specifies a frequency for updating the location information to the client.

5. The method of claim 1, wherein the response is sent as a unicast message from the access point to the client.

6. The method of claim 1, wherein the access point functions as a location gateway by snooping location queries, looking up client location data, adding access point location data, and sending responses to clients.

7. The method of claim 1, wherein the client includes one or more client applications.

8. A system comprising one or more processors configured to perform operations comprising:
- receiving, at an access point, a location discovery request message from a client;
- measuring received signal strength from the client;
- determining that the client is moving based on a varying value of the received signal strength;
- refreshing client location information if the value of the received signal strength varies beyond a threshold, wherein refreshing of the client location information comprises sending a request from the access point to a location server, wherein the request requests client location information for the client, and wherein the location discovery request message specifies a frequency for updating the location information to the client;
- receiving client location information from the location server if the location server is available;
- caching the client location information at the access point, wherein the access point functions as the location server and responds to location discover requests based on cached client location information;
- determining access point location information of the access point if the location server is not available; and
- sending either the client's location information or the access point location information in a response to the client if the location information indicates that a location of the client has changed.

9. The system of claim 8, wherein the location discovery request message is a multicast request sent over a reserved link-local multicast address and the access point snoops the multicast request.

10. The system of claim 8, wherein the location discovery request message specifies a type of location data being requested.

11. The system of claim 8, wherein the location discovery request message specifies a frequency for updating the location information to the client.

12. The system of claim 8, wherein the response is sent as a unicast message from the access point to the client.

13. The system of claim 1, wherein the client includes a client device.

14. The system of claim 1, wherein the client includes one or more client applications.

15. A non-transitory computer readable medium having stored thereon software instructions that, when executed by a processor of a wireless controller, cause the processor to perform operations comprising:
- receiving, at an access point, a location discovery request message from a client;
- measuring received signal strength from the client;
- determining that the client is moving based on a varying value of the received signal strength;
- refreshing client location information if the value of the received signal strength varies beyond a threshold, wherein refreshing of the client location information comprises sending a request from the access point to a location server, wherein the request requests client location information for the client, and wherein the location discovery request message specifies a frequency for updating the location information to the client;
- receiving client location information from the location server if the location server is available;
- caching the client location information at the access point, wherein the access point functions as the location server and responds to location discover requests based on cached client location information;
- determining access point location information of the access point if the location server is not available; and
- sending either the client's location information or the access point location information in a response to the client if the location information indicates that a location of the client has changed.

16. The computer readable medium of claim 15, wherein the location discovery request message is a multicast request sent over a reserved link-local multicast address and the access point snoops the multicast request.

17. The computer readable medium of claim 15, wherein the location discovery request message specifies a type of location data being requested.

18. The computer readable medium of claim 15, wherein the location discovery request message specifies a frequency for updating the location information to the client.

19. The computer readable medium of claim 15, wherein the response is sent as a unicast message from the access point to the client.

20. The computer readable medium of claim 15, wherein the client includes one or more of a client device and one or more client applications.

* * * * *